(12) United States Patent
Fujikawa et al.

(10) Patent No.: US 11,884,553 B2
(45) Date of Patent: Jan. 30, 2024

(54) MAGNESIUM OXIDE POWDER, THERMALLY CONDUCTIVE FILLER, RESIN COMPOSITION, AND PRODUCTION METHOD FOR MAGNESIUM OXIDE POWDER

(71) Applicant: Ube Material Industries, Ltd., Ube (JP)

(72) Inventors: Isamu Fujikawa, Ube (JP); Masamichi Nakagawa, Ube (JP); Takashi Hamaoka, Ube (JP); Takeshi Himoto, Ube (JP); Seiji Yamaguchi, Ube (JP); Kunio Watanabe, Ube (JP)

(73) Assignee: UBE MATERIAL INDUSTRIES, LTD., Ube (JP)

( * ) Notice: Subject to any disclaimer, the term of this patent is extended or adjusted under 35 U.S.C. 154(b) by 0 days.

(21) Appl. No.: 18/010,586

(22) PCT Filed: Dec. 1, 2021

(86) PCT No.: PCT/JP2021/044152
§ 371 (c)(1),
(2) Date: Dec. 15, 2022

(87) PCT Pub. No.: WO2022/138037
PCT Pub. Date: Jun. 30, 2022

(65) Prior Publication Data
US 2023/0192504 A1    Jun. 22, 2023

(30) Foreign Application Priority Data
Dec. 25, 2020    (JP) ................. 2020-217797

(51) Int. Cl.
*C01F 5/02*    (2006.01)
*C08K 3/22*    (2006.01)

(52) U.S. Cl.
CPC .............. *C01F 5/02* (2013.01); *C08K 3/22* (2013.01); *C01P 2002/70* (2013.01);
(Continued)

(58) Field of Classification Search
CPC .................................. C01F 5/02; C08K 3/22
See application file for complete search history.

(56) References Cited

U.S. PATENT DOCUMENTS

| 2014/0087614 A1 | 3/2014 | Matsuda et al. |
| 2016/0222273 A1 | 8/2016 | Nishida et al. |

(Continued)

FOREIGN PATENT DOCUMENTS

| CN | 105246831 A | 1/2016 |
| CN | 105579506 A | 5/2016 |

(Continued)

OTHER PUBLICATIONS

Office Action dated Mar. 3, 2023, issued in counterpart TW Application No. 110144913. (13 pages).

(Continued)

*Primary Examiner* — James A Fiorito
(74) *Attorney, Agent, or Firm* — WHDA, LLP

(57) ABSTRACT

This magnesium oxide powder contains secondary particles in which a plurality of primary particles of magnesium oxide having a crystal phase and a grain boundary phase are at least partially fused together by the grain boundary phase, and a median diameter obtained by a laser diffraction scattering method is 300 μm or less.

10 Claims, 1 Drawing Sheet

(52) U.S. Cl.
CPC ...... *C01P 2006/12* (2013.01); *C01P 2006/16* (2013.01); *C08K 2003/222* (2013.01); *C08K 2201/001* (2013.01)

(56) References Cited

U.S. PATENT DOCUMENTS

| | | |
|---|---|---|
| 2019/0359873 A1 | 11/2019 | Konishi et al. |
| 2020/0246864 A1 | 8/2020 | Nishida et al. |

FOREIGN PATENT DOCUMENTS

| | | |
|---|---|---|
| CN | 106029571 A | 10/2016 |
| CN | 109437258 A | 3/2019 |
| CN | 110944943 A | 3/2020 |
| JP | 2008-184366 A | 8/2008 |
| JP | 2010-173913 A | 8/2010 |
| JP | 2012-116715 A | 6/2012 |
| JP | 2012-233100 A | 11/2012 |
| JP | 2014-214222 A | 11/2014 |
| JP | 2015-59050 A | 3/2015 |
| JP | 2016-88838 A | 5/2015 |
| JP | 6507214 B1 | 4/2019 |
| JP | 2019-99413 A | 6/2019 |
| JP | 2021-161005 A | 10/2021 |
| KR | 10-2019-0117476 A | 10/2019 |
| KR | 10-2020-0033717 A | 3/2020 |
| TW | 201111282 A | 4/2011 |

OTHER PUBLICATIONS

International Search Report dated Feb. 15, 2022, issued in counterpart International Application No. PCT/JP2021/044152, with English Translation. (6 pages).

Notification of Reasons for Refusal dated Aug. 9, 2022, issued in counterpart of Japanese Patent Application No. 2022-107138, with English Translation. (4 pages).

Office Action dated Mar. 31, 2023, issued in counterpart CN application No. 202180039230.7, with partial English translation. (8 pages).

Notice of Allowance dated Sep. 15, 2023, issued in counterpart to KR Application No. 10-2023-7002959, with English Translation. (7 pages).

MAGNESIUM OXIDE POWDER, THERMALLY CONDUCTIVE FILLER, RESIN COMPOSITION, AND PRODUCTION METHOD FOR MAGNESIUM OXIDE POWDER

TECHNICAL FIELD

The present invention relates to a magnesium oxide powder, a thermally conductive filler, a resin composition, and a method for producing a magnesium oxide powder.

The present application claims priority on Japanese Patent Application No. 2020-217797 filed on Dec. 25, 2020, the content of which is incorporated herein by reference.

BACKGROUND ART

A magnesium oxide powder is a powder of an inorganic compound having excellent thermal conductivity and heat resistance, and is used as a thermally conductive filler in various resins. For example, a resin composition containing a resin and a magnesium oxide powder is utilized as a heat dissipation material for electronic apparatuses. In order to improve the filling properties of a magnesium oxide powder with respect to a resin, a magnesium oxide powder in which the shape of particles is spherical has been studied.

As a method for producing a spherical magnesium oxide powder, a method of polishing a magnesium oxide powder obtained by grinding a magnesia clinker to peel particle surfaces is known (Patent Document 1). In addition, as a method for producing a spherical magnesium oxide powder, a method of granulating a mixture containing magnesium hydroxide particles and a lithium compound and sintering the obtained granulated bodies is known (Patent Document 2).

PRIOR ART DOCUMENTS

Patent Document

Patent Document 1: Japanese Patent No. 6507214
Patent Document 2: Japanese Unexamined Patent Application, First Publication No. 2016-88838

DISCLOSURE OF INVENTION

Problems to be Solved by the Invention

Due to the recent increase in output and density of electronic apparatuses, there is a demand for improvement in thermal conductivity of heat dissipation materials. A spherical magnesium oxide powder, which is used as a thermally conductive filler in a resin composition for heat dissipation materials, has high filling properties with respect to a resin. However, in the spherical magnesium oxide powder, a contact area between particles is small. Therefore, in order to form a thermally conductive path between particles, it is required to increase the filling amount of the spherical magnesium oxide powder contained in the resin composition. Increasing the filling amount of the spherical magnesium oxide powder is economically disadvantageous and has a problem in that the specific gravity of the obtained resin composition becomes large.

The present invention has been made in view of the circumstances described above, and an objective thereof is to provide a magnesium oxide powder in which a thermally conductive path is easily formed, a method for producing the magnesium oxide powder, and a thermally conductive filler. Another objective of the present invention is to provide a resin composition having high thermal conductivity.

Solutions for Solving the Problems

As a result of intensive studies in order to achieve the above-mentioned objects, the inventors of the present invention found that a magnesium oxide powder containing granular bodies, in each of which a plurality of substantially spherical primary particles of magnesium oxide are at least partially fused together by a grain boundary phase, can be obtained by sintering a raw material mixture containing magnesium hydroxide particles and/or magnesium oxide particles and a grain boundary forming component in a predetermined proportion. In addition, they confirmed that in the magnesium oxide powder containing secondary particles as the granular bodies and having a median diameter of 300 μm or less obtained by a laser diffraction scattering method, a thermally conductive path is easily formed, and that a resin composition in which this magnesium oxide powder has been dispersed in a resin has a high thermal conductivity. Thereby, the present invention was completed. Accordingly, the present invention has the following features.

[1] A magnesium oxide powder including secondary particles in which a plurality of primary particles of magnesium oxide having a crystal phase and a grain boundary phase are at least partially fused together by the grain boundary phase, and a median diameter obtained by a laser diffraction scattering method is 300 μm or less.

[2] The magnesium oxide powder according to [1], in which a ratio (median diameter/volume average equivalent circle diameter) of the median diameter to a volume average equivalent circle diameter of the primary particles of magnesium oxide obtained by analyzing an image measured with an electron scanning microscope is in a range of 1.2 or more and 6.0 or less.

[3] The magnesium oxide powder according to [2], in which the ratio (median diameter/volume average equivalent circle diameter) of the median diameter to the volume average equivalent circle diameter of the primary particles of magnesium oxide is in a range of 1.5 or more and 5.0 or less.

[4] The magnesium oxide powder according to any one of [1] to [3], in which the median diameter is in a range of 10 μm or more and 150 μm or less.

[5] The magnesium oxide powder according to any one of [1] to [4], in which a BET specific surface area is 1 $m^2/g$ or less.

[6] The magnesium oxide powder according to any one of [1] to [5], in which an amount of magnesium oxide is 94% by mass or more.

[7] The magnesium oxide powder according to any one of [1] to [6], in which the magnesium oxide powder contains a total amount of 0.8% by mass or more of calcium, silicon, and boron, the total amount being in terms of oxides of calcium, silicon, and boron.

[8] The magnesium oxide powder according to any one of [1] to [7], in which a coupling agent is attached to a surface of the secondary particle.

[9] A thermally conductive filler including the magnesium oxide powder according to any one of [1] to [8].

[10] A resin composition including: a resin; and a thermally conductive filler dispersed in the resin, in which the thermally conductive filler is the thermally conductive filler according to [9].

[11] A method for producing the magnesium oxide powder according to any one of [1] to 7], the method including:
  a step of preparing a raw material mixture which contains magnesium hydroxide particles and/or magnesium oxide particles, a grain boundary forming component, and impurities and in which an amount of the magnesium hydroxide particles and/or the magnesium oxide particles is 94% by mass or more in terms of magnesium oxide and an amount of the grain boundary forming component is 0.8% by mass or more in terms of oxide;
  a step of sintering the raw material mixture to obtain a sintered material; and
  a step of classifying the sintered material.

Effects of Invention

According to the present invention, a magnesium oxide powder in which a thermally conductive path is easily formed, a method for producing the magnesium oxide powder, and a thermally conductive filler can be provided. According to the present invention, a resin composition having a high thermal conductivity can also be provided.

EMBODIMENTS FOR CARRYING OUT THE INVENTION

Hereinafter, embodiments of a magnesium oxide powder, a thermally conductive filler, a resin composition, and a method for producing a magnesium oxide powder of the present invention will be described.

The magnesium oxide powder of the present embodiment contains secondary particles, and in the secondary particle, a plurality of primary particles of magnesium oxide are fused together. The amount of the secondary particles in the magnesium oxide powder is preferably 30% or more, more preferably 50% or more, and further preferably 70% or more based on the number. The secondary particle in which the primary particles of magnesium oxide are at least partially fused together by a grain boundary phase can be easily identified on an electron scanning microscope (SEM) image. Therefore, the amount of the secondary particles of the magnesium oxide powder can be measured by counting the number of the secondary particles in which a plurality of the primary particles are fused together using a SEM.

Figure 1:
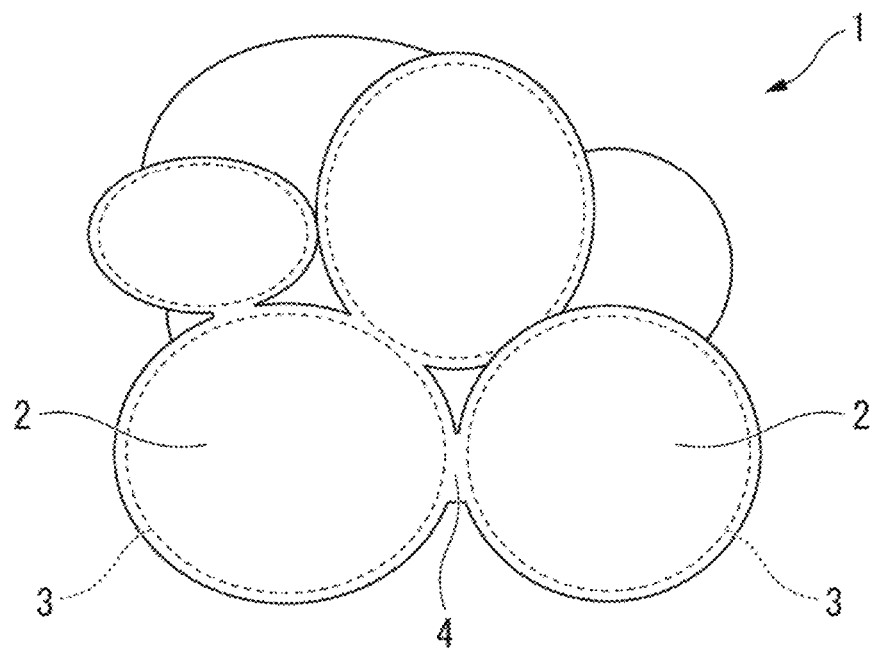
FIG. 1 is a conceptual diagram of a secondary particle contained in a magnesium oxide powder according to one embodiment of the present invention.

FIG. 1 is a conceptual diagram of the secondary particle contained in the magnesium oxide powder according to one embodiment of the present invention.

As shown in FIG. 1, the secondary particle 1 in which primary particles 2 of magnesium oxide are at least partially fused together by a grain boundary phase 4 includes a plurality of the primary particles 2 of magnesium oxide. It is presumed that in the secondary particle 1, the component of the grain boundary phase 4 acts as a flux; and thereby, the primary particles 2 of magnesium oxide including crystal phase 3 are at least partially fused together.

The secondary particle 1 in which the primary particles 2 of magnesium oxide are at least partially fused together by the grain boundary phase 4 may be in an indeterminate shape in which a plurality of the primary particles 2 of magnesium oxide are irregularly fused together. Furthermore, the secondary particle 1 may be in a shape having a plurality of protrusions and recesses on the surface or a distorted spherical shape. When the shape of the secondary particle 1 is in an indeterminate shape or a shape having a plurality of protrusions and recesses, the contact area between the secondary particles 1 can be increased; and thereby, it is possible to easily form a thermally conductive path between the secondary particles in the magnesium oxide powder containing the secondary particles 1.

The primary particle 2 of magnesium oxide includes the crystal phase 3 and the grain boundary phase 4. The primary particle 2 of magnesium oxide may be single crystalline or may be poly crystalline. The shape of the primary particle 2 of magnesium oxide is not particularly limited, and for example, the shape may be spherical, ellipsoid, cylindrical, or prismatic. In addition, the primary particle 2 of magnesium oxide may be in an indeterminate granule shape.

The crystal phase 3 mainly contains magnesium oxide. The grain boundary phase 4 contains a low-melting point compound having a melting point lower than that of magnesium oxide. For example, the low-melting point compound may be a compound containing calcium, silicon, and boron. The low-melting point compound may be an oxide containing calcium, silicon, and boron. A plurality of the primary particles 2 of magnesium oxide are at least partially fused together by the grain boundary phase 4. Therefore, with regard to the primary particles 2 of magnesium oxide in the secondary particle 1, a thermally conductive path between the particles is easily formed. In addition, since the low-melting point compound acts as a flux, the crystal phase 3 may grow in the grain boundary phase 4 to be fused to each other. Since the crystal phase 3 mainly includes magnesium oxide having a high thermal conductivity, the case in which the crystal phase 3 is also fused together is desirable from the viewpoint of forming a thermally conductive path.

The median diameter of the magnesium oxide powder measured by a laser diffraction scattering method is 300 μm or less. The particle size measured by the laser diffraction scattering method corresponds to the particle size of the above-mentioned secondary particle 1 in which the primary particles 2 of magnesium oxide am at least partially fused together by the grain boundary phase 4. When the median diameter is 300 μm or less, the dispersibility and the filling properties of the magnesium oxide powder are improved. In addition, the median diameter may be 10 μm or more. When the median diameter is 10 μm or more which is large, a thermally conductive path is easily formed by the magnesium oxide powder in a resin. Furthermore, in the magnesium oxide powder in which the median diameter is 10 μm or more which is large, hydration resistance is improved, and degeneration due to moisture is less likely to occur. Therefore, in a resin composition in which the magnesium oxide powder having the median diameter in a range of 10 μm or more and 300 μm or less is dispersed, a thermal conductivity is improved over a long period of time. The median diameter is preferably in a range of 10 μm or more and 150 μm or less, more preferably in a range of 30 μm or more and 150 μm or less, and particularly preferably in a range of 30 μm or more and 140 μm or less.

The magnesium oxide powder may be constituted such that a ratio of the above-mentioned median diameter (median diameter of the secondary particles 1) to the volume average equivalent circle diameter of the primary particles 2 of magnesium oxide obtained by analyzing an image taken by SEM is in a range of 1.2 or more and 6.0 or less. This median diameter/volume average equivalent circle diameter indicates the number (degree of fusion) of the primary particles 2 of magnesium oxide fused together in the secondary particle 1. That is, when the median diameter/volume average equivalent circle diameter is large, this means that the number of the primary particles 2 of magnesium oxide fused together in the secondary particle 1 is large (a high degree of fusion). When the median diameter/volume average equivalent circle diameter is in the above-mentioned range, a thermally conductive path is easily formed between the particles, and the dispersibility and the filling properties of the magnesium oxide powder are improved. From the viewpoint of ease of forming a thermally conductive path, the median diameter/volume average equivalent circle diameter is preferably in a range of 1.5 or more and 5.0 or less, more preferably in a range of 2.0 or more and 5.0 or less, and particularly preferably in a range of 2.8 or more.

The volume average equivalent circle diameter of the primary particles 2 of magnesium oxide is a median diameter obtained by a method which includes: conducting image analysis of a SEM image to obtain a projected area of the primary particle 2 of magnesium oxide; converting the projected area into a circle to calculate an equivalent circle diameter; and accumulating the volume-based frequency of the equivalent circle diameters to obtain the median diameter. The volume average equivalent circle diameter may be in a range of 2.0 μm or more and 250 μm or less. The volume average equivalent circle diameter is preferably in a range of 5.0 μm or more and 150 μm or less, and particularly preferably in a range of 5.0 μm or more and 100 μm or less.

The BET specific surface area of the magnesium oxide powder may be 1 $m^2/g$ or less. When the BET specific surface area is in this range, this means that the magnesium oxide powder has few pores and is a dense sintered material. The BET specific surface area is preferably 0.8 $m^2/g$ or less, and particularly preferably 0.5 $m^2/g$ or less. The BET specific surface area may generally be 0.01 $m^2/g$ or more.

The crystallite size of the magnesium oxide powder is preferably 1000 Å or more, more preferably 1200 Å or more, further preferably 1500 Å or more, and particularly preferably 2000 Å or more. The larger the crystallite size, the higher the crystallinity of the magnesium oxide, and the higher the crystallinity, the higher the thermal conductivity and the higher the water resistance.

In the magnesium oxide powder, the amount of magnesium oxide may be 94% by mass or more. When the amount of magnesium oxide is 94% by mass or more which is large, the thermal conductivity of the magnesium oxide powder is improved. The amount of magnesium oxide is preferably 95% by mass or more, and particularly preferably 97% by mass or more.

The magnesium oxide powder may contain substances other than magnesium oxide in an amount in a range of 0.8% by mass or more and 6% by mass or less in terms of oxide. The amount of the substances other than magnesium oxide in terms of oxide is preferably in a range of 0.8% by mass or more and 5% by mass or less, and particularly preferably in a range of 0.8% by mass or more and 3% by mass or less. The substances other than magnesium oxide include a low-melting point compound that forms grain boundary phases, and impurities. Among the substances other than magnesium oxide, the total amount of calcium, silicon, and boron, all of which mainly form the low-melting point compound, is preferably 0.8% by mass or more and particularly preferably 1.0% by mass or more, provided that the total amount is in terms of oxides of calcium, silicon, and boron. When the amount of the low-melting point compound is in the above-mentioned range, the primary particles of magnesium oxide can be strongly fused together. Furthermore, when the low-melting point compound acts as a flux; and thereby, the crystal phase of the magnesium oxide is also fused together, a thermally conductive path between the particles can be more reliably formed.

The magnesium oxide powder may be constituted such that a coupling agent is attached. The type of coupling agent is not particularly limited, and for example, silane coupling agents, aluminate-based coupling agents, zirconium-based coupling agents, and titanate-based coupling agents can be used. The coupling agent can be appropriately selected depending on the type of resin to be filled with the magnesium oxide. A silane coupling agent is desirable as the coupling agent, and a silane coupling agent having a vinyl group, a phenyl group, or an amino group is particularly preferable.

The magnesium oxide powder may be constituted such that it is further treated with a surface modifier. As the surface modifier, metallic soaps such as magnesium stearate, surfactants such as sodium stearate, and the like can be used.

The magnesium oxide powder constituted as described above can be used as a thermally conductive filler, particularly as a thermally conductive filler for resins and rubbers. The type of resin is not particularly limited, and for example, thermoplastic resins, thermosetting resins, greases, waxes, and the like can be used.

A resin composition containing a resin and the magnesium oxide powder dispersed in the resin preferably contains the magnesium oxide powder in a range of 30% by volume or more and 80% by volume or less. For example, the resin composition can be utilized as a heat dissipation material for lamp sockets and various electrical parts in the field of automobiles. Furthermore, in the field of electronic apparatuses, the resin composition can be utilized as a heat dissipation material for heat sinks, die pads, printed circuit boards, semiconductor package parts, cooling fan parts, pickup parts, connectors, switches, bearings, and case housings.

For example, the magnesium oxide powder can be produced by a method including a (a) raw material step, a (b) sintering step, and a (c) classification step.

(a) Raw Material Step

In the raw material step, a raw material mixture containing a magnesium oxide source that produces magnesium oxide by sintering, and a grain boundary forming component that forms a grain boundary phase is prepared. As the magnesium oxide source, magnesium hydroxide particles and/or magnesium oxide particles can be used. The raw material mixture contains the magnesium oxide source, an additive substance that constitutes the grain boundary forming component, and impurities in addition to these. The amount of the magnesium oxide source is 94% by mass or more in terms of magnesium oxide amount, and the amount of the grain boundary forming component is 0.8% by mass or more in terms of oxide amount.

The raw material mixture can be prepared by mixing the magnesium oxide source and the additive substance that constitutes the grain boundary forming component (low-melting point compound). Furthermore, a raw material mixture containing magnesium hydroxide particles and a grain boundary forming component can be prepared by, for example, a method which includes: slaking quicklime and thereafter removing the residue for purification to obtain lime milk (calcium hydroxide slurry); mixing the lime milk with seawater to react the calcium hydroxide with magnesium salts in seawater and to produce magnesium hydroxide;

and appropriately adding each of additive substances of a silica source, a boron source, and a calcium source to magnesium hydroxide. This magnesium hydroxide prepared using seawater and lime milk mainly contains calcium and silicon derived from lime milk, and boron derived from seawater.

(b) Sintering Step

In the sintering step, the raw material mixture obtained in the (a) raw material step is sintered to obtain a sintered material. The sintered material contains the magnesium oxide powder containing the secondary particles, and in the secondary particle, a plurality of the primary particles of magnesium oxide are at least partially fused together by the grain boundary phase. The sintering temperature of the raw material mixture is the temperature at which magnesium oxide is produced and the grain boundary forming component is incited. For example, the sintering temperature is in a range of 1000° C. or higher and 2000° C. or lower, preferably in a range of 1500° C. or higher and 2000° C. or lower, and particularly preferably in a range of 1600° C. or higher and 2000° C. or lower. As a sintering apparatus, an apparatus capable of sintering while stirring the raw material mixture such that the secondary particles are appropriately produced is used. For example, as the sintering apparatus, a rotary kiln can be used. When the sintering temperature in the sintering step increases, the crystallite size of the obtained magnesium oxide powder tends to increase.

(c) Classification Step

In the classification step, the sintered material obtained in the (b) sintering step is classified to remove coarse particles of the sintered material and adjust the particle size distribution of the sintered material. A classification method is not particularly limited, and a classification method using a classification apparatus such as a vibrating sieve, a wind power classifier, or a cyclone type classifier can be utilized. For the classification apparatus, one type of classification apparatus may be used alone, or two or more types of classification apparatus may be used in combination. In the classification step, the secondary particles having a predetermined median diameter may be obtained by classifying and removing coarse particles using a vibrating sieve. Furthermore, the particle size distribution of the secondary particles may be adjusted by removing particles that are too small with a wind power classifier.

According to the method for producing the magnesium oxide powder configured as described above, since the magnesium oxide source and the grain boundary forming component (low-melting point compound) are contained in a predetermined proportion, the secondary particle in which a plurality of the primary particles of magnesium oxide are fused together can efficiently obtained by the sintering step.

EXAMPLES

Example 1

(a) Raw Material Step

Quicklime was slaked, and then the residue was removed for purification; and thereby, lime milk (calcium hydroxide slurry) was obtained. The lime milk (calcium hydroxide slurry) was mixed with decarbonated seawater, and the calcium hydroxide was reacted with magnesium salts in seawater to prepare a magnesium hydroxide slurry. The obtained magnesium hydroxide slurry was dehydrated using a rotary disk filter to obtain a magnesium hydroxide cake having an amount of moisture of 40%. The obtained magnesium hydroxide cake contained $CaO$, $SiO_2$, $B_2O_3$, $Fe_2O_3$, and $Al_2O_3$. The obtained magnesium hydroxide cake and boric acid were mixed at a proportion such that the amount of $B_2O_3$ after sintering at 1800° C. was 0.8% by mass. Thereafter, drying was performed using a rotary dryer such that the amount of moisture was 10% by mass; and thereby, a raw material mixture was prepared.

(b) Sintering Step

The raw material mixture obtained in the above-mentioned (a) raw material step was molded into an almond shape of about 30 mm using a briquetting machine. The obtained almond-shaped molded material was sintered at 1800° C. for 8 hours using a rotary kiln to obtain magnesium oxide (sintered material). The obtained magnesium oxide contained the sintered bodies of the granular molded material, and powdery magnesium oxide particles (secondary particles) detached from the sintered bodies of the granular molded material.

(c) Classification Step

From the magnesium oxide obtained in the above-mentioned (b) sintering step, coarse particles (including the sintered bodies of the granular molded material) having the particle size of 300 µm or more were removed using a vibrating sieve having an aperture of 300 µm. Subsequently, the magnesium oxide powder having the particle size of less than 300 µm was classified using a wind power classifier to remove fine particles having a particle size of 75 µm or less. The magnesium oxide powder having a particle size of more than 75 µm and less than 300 µm obtained as described above was recovered and used as a magnesium oxide powder of Example 1.

Example 2

A magnesium oxide powder of Example 2 was produced in the same manner as in Example 1 except that in the (c) classification step of Example 1, coarse particles were removed using a vibrating sieve having an aperture of 1 mm, and then classification was further performed using a wind power classifier to recover a magnesium oxide powder having a particle size of 75 µm or less.

Comparative Example 1

In the (c) classification step of Example 1, coarse particles were removed using a vibrating sieve having an aperture of 1 mm, and then grinding was further performed using a jet mill (swirling flow type jet mill STJ-200 type, manufactured by SEISHIN ENTERPRISE Co., Ltd.). The obtained ground material was classified using a wind power classifier to recover a magnesium oxide powder having a particle size of 45 µm or less, and this magnesium oxide powder was used as a magnesium oxide powder of Comparative Example 1.

[Evaluation]

The magnesium oxide powders obtained in Examples 1 and 2 and Comparative Example 1 were observed using a Field Emission Scanning Electron Microscope (FE-SEM: S-4800, manufactured by Hitachi High-Tech Corporation). The results of Example 1 are shown in FIG. 2.

Figure 2:
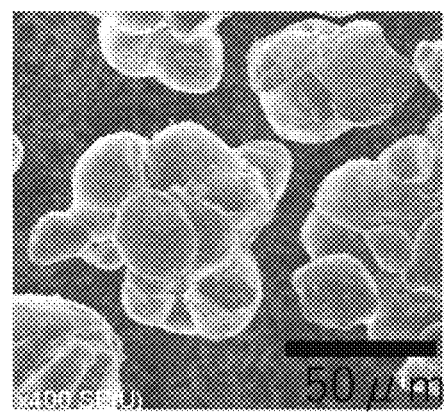
FIG. 2 is a SEM photograph of a magnesium oxide powder obtained in Example 1.

FIG. 2 is a SEM photograph of the magnesium oxide powder obtained in Example 1. As shown in FIG. 2, it was confirmed that the magnesium oxide powder of Example 1 contained secondary particles in which a plurality of primary particles of magnesium oxide were at least partially fused together. Furthermore, as a result of elemental analysis of the fused portion at which the primary particles of magnesium oxide were fused to each other, the fused portion contained calcium, silicon, and boron at high concentrations.

From this result, it was confirmed that the primary particle of magnesium oxide included a crystal phase mainly containing magnesium oxide and a grain boundary phase (low-melting point compound) containing calcium, silicon, and boron, and that a plurality of the primary particles of magnesium oxide were fused together by the grain boundary phase. Similarly, it was also confirmed that the magnesium oxide powder of Example 2 contained secondary particles in which a plurality of primary particles of magnesium oxide were fused together. On the other hand, in the magnesium oxide powder of Comparative Example 1, almost no secondary particles were observed.

For the magnesium oxide powders obtained in Examples 1 and 2 and Comparative Example 1, the composition, the median diameter, the volume average equivalent circle diameter, the amount of the secondary particles, the BET specific surface area, and the thermal conductivity were measured by the following methods. Table 1 shows the measurement results thereof, and the ratio of the median diameter to the volume average equivalent circle diameter (median diameter/volume average equivalent circle diameter).

(Composition)

The amounts of $CaO$, $SiO_2$, $B_2O_3$, $Fe_2O_3$, and $Al_2O_3$ were measured in accordance with JIS R 2212-4:2006 (Methods For Chemical Analysis Of Refractory Products—Part 4: Magnesite And/or Dolomite Refractories). The amount of MgO was a value obtained by subtracting the total amount of $CaO$, $SiO_2$, $B_2O_3$, $Fe_2O_3$, and $Al_2O_3$ from 100% by mass.

(Median Diameter)

1.5 g of the magnesium oxide powder and 30 mL of pure water were added to a beaker and mixed so that the magnesium oxide powder was uniformly dispersed in water. The obtained magnesium oxide dispersion liquid was put into a particle size distribution measurement device (MT3300EX, manufactured by MicrotracBEL Corp.) to measure the median diameter of the magnesium oxide powder by a laser diffraction scattering method under the following conditions.

<Conditions>

Light source: semiconductor laser, 780 nm, 3 mW, class 1 laser

Refractive index: 1.74 (MgO)-1.333 (water)

Number of measurements: Avg/3

Measurement time: 30 seconds (Volume Average Equivalent Circle Diameter)

The magnesium oxide powder that was not subjected to vapor deposition as a pretreatment was imaged using a Field Emission Scanning Electron Microscope (FE-SEM: S-4800, manufactured by Hitachi High-Tech Corporation) to obtain a SEM image. The obtained SEM image was analyzed using image analysis software (Mac-view, manufactured by Mountech Co., Ltd.) to calculate the equivalent circle diameters (Heywood diameters) of the primary particles of magnesium oxide. The equivalent circle diameters of 200 primary particles of magnesium oxide were calculated, and the median diameter obtained by accumulating the volume-based frequency was taken as the volume average equivalent circle diameter.

(Amount of Secondary Particles)

From the SEM image obtained in the same manner as above, for 200 particles, the number of secondary particles in which the primary particles of magnesium oxide were at least partially fused together, and the number of primary particles that did not form the above-mentioned secondary particles were counted, and the proportion of the secondary particles in which the primary particles of magnesium oxide were at least partially fused together in 200 particles was defined as the amount of the secondary particles.

(BET Specific Surface Area)

The BET specific surface area was measured by a single-point BET method. As a measurement device, a Monosorb manufactured by Quantachrome instruments Japan was used, and as a pretreatment, a cell for measurement filled with the magnesium oxide powder was dried and degassed at 180° C. for 10 minutes.

(Crystallite Size) The crystallite size of the (200) plane (a-axis direction) of the magnesium oxide powder was measured. An X-ray diffraction pattern was measured using a powder X-ray diffractometer (D8 ADVANCE, manufactured by Bruker) under the following conditions. Using an alumina sintered plate as a standard specimen, diffraction peak broadening correction was performed using the apparatus. The crystallite size of the (200) plane (a-axis direction) was calculated from the half value width of the X-ray diffraction peak of the (200) plane of the obtained X-ray diffraction pattern using the Scherrer equation. A Scherrer constant K of 0.9 was used.

<Conditions>

X-ray source: CuKα ray

Tube voltage-tube current: 40 kV-40 mA

Step width: 0.02 deg

Measurement rate: 0.5 sec/step

Divergence slit: 10.5 mm (Thermal Conductivity)

(1) Production of Test Piece (Thermally Conductive Resin Composition)

The magnesium oxide powder and a dimethyl silicone resin (KE-106, manufactured by Shin-Etsu Chemical Co., Ltd.) were kneaded at a blending ratio of magnesium oxide: dimethyl silicone resin=40% by volume: 60% by volume. The obtained kneaded material was poured into a polypropylene mold of 60 mm×80 mm×10 mm and degassed under reduced pressure of 0.08 MPa for 30 minutes in a vacuum chamber. Thereafter, heating was performed in an oven at 100° C. for 60 minutes to cure the kneaded material; and thereby, a thermally conductive resin composition was obtained. The obtained thermally conductive resin composition was cut into pieces of 20 mm×20 mm×2 mm to produce test pieces for thermal conductivity measurement. Four test pieces were produced.

(2) Measurement of Thermal Conductivity

The thermal conductivity was measured using a thermophysical property measurement device. TPS 2500 S manufactured by KYOTO ELECTRONICS MANUFACTURING CO., LTD., and a measurement probe of C7577 type (diameter: 4 mm) was used.

The four test pieces obtained in the above-described (1) were set by sandwiching the two pieces on the top and the two pieces on the bottom of the measurement probe of the thermophysical property measurement device, and the thermal conductivity of the test pieces were measured by a hot disk method (transient plane heat source method) under the following conditions.

(Conditions)

Measurement time: 5 seconds

Heating amount: 200 mW

Measurement environment temperature: 20° C.

TABLE 1

| | Composition (% by mass) | | | | | | Median diameter (μm) | Volume average equivalent circle diameter (μm) | Median diameter/volume average equivalent circle diameter | Amount of secondary particles (number %) | BET specific surface area (m²/g) | Crystallite size (Å) | Thermal conductivity (W·mk) |
|---|---|---|---|---|---|---|---|---|---|---|---|---|---|
| | MgO | CaO | SiO$_2$ | B$_2$O$_3$ | Fe$_2$O$_3$ | Al$_2$O$_3$ | | | | | | | |
| Example 1 | 97.43 | 0.80 | 0.80 | 0.80 | 0.08 | 0.09 | 88.66 | 29.81 | 2.97 | 83 | 0.04 | 3725 | 1.12 |
| Example 2 | 97.43 | 0.80 | 0.80 | 0.80 | 0.08 | 0.09 | 61.27 | 28.48 | 2.15 | 51 | 0.1 | 1873 | 1.00 |
| Comparative Example 1 | 97.43 | 0.80 | 0.80 | 0.80 | 0.08 | 0.09 | 21.94 | 23.17 | 0.95 | — | 0.094 | 673 | 0.81 |

From the results in Table 1, it was confirmed that in the resin compositions using the magnesium oxide powders of Examples 1 and 2 which contained the secondary particles in which a plurality of the primary particles of magnesium oxide were fused together by the grain boundary phase, the thermal conductivity was improved by 20% or more as compared to the resin composition using the magnesium oxide powder of Comparative Example 1. In particular, it was confirmed that in the resin composition using the magnesium oxide powder of Example 1 which had the median diameter/volume average equivalent circle diameter of 2.8 or more, the thermal conductivity was improved by 40% as compared to the resin composition using the magnesium oxide powder of Comparative Example 1.

Example 3

100 kg of the magnesium oxide powder produced in the same manner as in Example 1 was charged in a Henschel mixer (FM300, manufactured by NIPPON COKE & ENGINEERING. CO., LTD., capacity: 300 L). 500 g of hexyltrimethoxysilane (manufactured by Shin-Etsu Chemical Co., Ltd., KBM-3063) was added to the magnesium oxide powder with an automatic addition machine while stirring the magnesium oxide powder at a circumferential speed of 15 m/sec of the Henschel mixer, and mixed. The mixture was further stirred for another 15 minutes from the time at which the temperature inside the tank of the Henschel mixer reached 100° C. due to the mixing of the magnesium oxide powder and hexyltrimethoxysilane. Thereby, the surface of the magnesium oxide powder was treated with hexyltrimethoxysilane. A thermally conductive resin composition was produced using the treated magnesium oxide powder, and the thermal conductivity was measured by the method described above. The results thereof are shown in Table 2 below.

Example 4

The surface of the magnesium oxide powder was treated with hexyltrimethoxysilane in the same manner as in Example 3 except that the magnesium oxide powder produced in the same manner as in Example 2 was used. A thermally conductive resin composition was produced from the treated magnesium oxide powder in the same manner as in Example 3, and the thermal conductivity was measured. The results thereof are shown in Table 2 below.

Comparative Example 2

The surface of the magnesium oxide powder was treated with hexyltrimethoxysilane in the same manner as in Example 3 except that the magnesium oxide powder produced in the same manner as in Comparative Example 1 was used. A thermally conductive resin composition was produced from the treated magnesium oxide powder in the same manner as in Example 3, and the thermal conductivity was measured. The results thereof are shown in Table 2 below.

TABLE 2

| | Type of magnesium oxide | Thermal conductivity (W·mk) |
|---|---|---|
| Example 3 | Example 1 | 1.09 |
| Example 4 | Example 2 | 1.00 |
| Comparative Example 2 | Comparative Example 1 | 0.86 |

From the results of Examples 3 and 4 and Comparative Example 2, it was confirmed that in the secondary particles of the present invention in which the primary particles of magnesium oxide were at least partially fused together, even when treatment with hexyltrimethoxysilane was performed, the thermal conductivity was improved as in the untreated case.

EXPLANATION OF REFERENCE SIGNS

1: Secondary particle
2: Primary particle of magnesium oxide
3: Crystal phase
4: Grain boundary phase

What is claimed is:
1. A magnesium oxide powder comprising:
secondary particles in an amount of 50% by number or more, wherein in the secondary particle, a plurality of primary particles of magnesium oxide having a crystal phase and a grain boundary phase are at least partially fused together by the grain boundary phase,
wherein a median diameter of the secondary particles obtained by a laser diffraction scattering method is 300 μm or less, and
a ratio of the median diameter of the secondary particles to a volume average equivalent circle diameter of the primary particles of magnesium oxide obtained by analyzing an image taken with an electron scanning microscope is in a range of 1.5 or more and 5.0 or less.
2. The magnesium oxide powder according to claim 1, wherein the ratio of the median diameter to the volume average equivalent circle diameter of the primary particles of magnesium oxide is in a range of 2.0 or more and 5.0 or less.
3. The magnesium oxide powder according to claim 1, wherein the median diameter is in a range of 10 μm or more and 150 μm or less.

4. The magnesium oxide powder according to claim 1, wherein a BET specific surface area is 1 m²/g or less.

5. The magnesium oxide powder according to claim 1, wherein a purity of magnesium oxide powder is 94% by mass or more.

6. The magnesium oxide powder according to claim 1, wherein the magnesium oxide powder contains a total amount of 0.8% by mass or more of calcium, silicon, and boron, the total amount being in terms of oxides of calcium, silicon, and boron.

7. The magnesium oxide powder according to claim 1, wherein a coupling agent is attached to a surface of the secondary particle.

8. A thermally conductive filler comprising the magnesium oxide powder according to claim 1.

9. A resin composition comprising:
a resin; and
a thermally conductive filler dispersed in the resin,
wherein the thermally conductive filler is the thermally conductive filler according to claim 8.

10. A method for producing the magnesium oxide powder according to claim 1, the method comprising:

a step of mixing magnesium hydroxide particles and/or magnesium oxide particles, and a grain boundary forming component in a presence of water and then drying a mixture to prepare a raw material mixture which contains the magnesium hydroxide particles and/or the magnesium oxide particles, the grain boundary forming component, and impurities and in which an amount of the magnesium hydroxide particles and/or the magnesium oxide particles is 94% by mass or more in terms of magnesium oxide and an amount of the grain boundary forming component is 0.8% by mass or more in terms of oxide;

a step of sintering the raw material mixture to obtain a sintered material; and a step of classifying the sintered material.

* * * * *